(12) United States Patent
Baier et al.

(10) Patent No.: US 11,281,016 B2
(45) Date of Patent: Mar. 22, 2022

(54) MODULATOR ASSEMBLY AND METHOD FOR MODULATING LIGHT

(71) Applicant: FRAUNHOFER-GESELLSCHAFT ZUR FÖRDERUNG DER ANGEWANDTEN FORSCHUNG E.V., Munich (DE)

(72) Inventors: Moritz Baier, Berlin (DE); Martin Schell, Berlin (DE); Francisco Soares, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 518 days.

(21) Appl. No.: 16/467,956

(22) PCT Filed: Dec. 11, 2017

(86) PCT No.: PCT/EP2017/082140
§ 371 (c)(1),
(2) Date: Jun. 8, 2019

(87) PCT Pub. No.: WO2018/104543
PCT Pub. Date: Jun. 14, 2018

(65) Prior Publication Data
US 2020/0073137 A1   Mar. 5, 2020

(30) Foreign Application Priority Data

Dec. 9, 2016   (DE) ..................... 10 2016 224 615.1

(51) Int. Cl.
*G02B 27/28* (2006.01)
*G02F 1/17* (2019.01)
(Continued)

(52) U.S. Cl.
CPC ......... *G02B 27/286* (2013.01); *G02B 5/3083* (2013.01); *G02F 1/01716* (2013.01); *G02F 1/025* (2013.01); *G02F 1/0155* (2021.01)

(58) Field of Classification Search
CPC ........ G02B 7/008; G02B 7/025; G02B 7/028; G02B 7/182; G02B 7/1822; G02B 7/32;
(Continued)

(56) References Cited

U.S. PATENT DOCUMENTS

| 4,103,260 A | 7/1978 | Buchman |
| 5,708,734 A | 1/1998 | Van Der Tol |

(Continued)

FOREIGN PATENT DOCUMENTS

GB   1331228 A   9/1973

OTHER PUBLICATIONS

Chelles, R. et al., "Efficient polarization insensitive electroabsorption modulator using strained InGaAsP-based quantum wells," Applied Physics Letters, vol. 64, No. 26, pp. 3530-3532 (Jun. 1994).
(Continued)

*Primary Examiner* — Collin X Beatty
*Assistant Examiner* — Grant A Gagnon
(74) *Attorney, Agent, or Firm* — Maschoff Brennan

(57) ABSTRACT

A modulator assembly for modulating light comprising a first and a second electro-absorption modulator which each at least substantially only act on a polarization component of incident light; a light generating assembly for generating light which includes a first and a second polarization component; a first electro-absorption modulator for modulating the light generated by the light generating assembly, wherein the first electro-absorption modulator at least substantially only modulates the first polarization component of the light, so that the light exiting from the first electro-absorption modulator includes a modulated and an unmodulated polar- (Continued)

ization component; a polarization converter for changing the polarization direction of the light exiting from the first electro-absorption modulator. The light exiting from the polarization converter couples into the second electro-absorption modulator and is polarized such that by means of the second electro-absorption modulator a modulation at least substantially is effected only of the previously unmodulated polarization component.

15 Claims, 2 Drawing Sheets

(51) Int. Cl.
*G02F 1/25* (2006.01)
*G02B 5/30* (2006.01)
*G02F 1/017* (2006.01)
*G02F 1/025* (2006.01)
*G02F 1/015* (2006.01)

(58) Field of Classification Search
CPC .............. G02F 1/093; G02F 1/09; G02F 1/31; G02F 2203/48; G02F 2203/06; G02F 1/0136; G02F 1/0036; G02F 1/092; G02F 2201/17; G02F 2201/16; G02F 2203/02; G02F 1/0139; G02F 1/095; G02F 1/0955; G02F 1/21; G02F 2203/055; G02F 1/0147; G02F 1/091; G02F 2203/07; G02F 2203/12; G02F 1/1326; G02F 1/13363; G02F 1/2255; G02F 1/29; G02F 2201/20; G02F 2203/04; G02F 2203/05; G02F 1/0123; G02F 1/03; G02F 1/0311; G02F 1/133512; G02F 1/133607; G02F 1/133638; G02F 1/133707; G02F 1/134363; G02F 1/167; G02F 1/172; G02F 1/212; G02F 1/313; G02F 2202/20; G02F 2202/40; G02F 2203/21; G02F 3/00; G02F 1/00; G02F 1/0102; G02F 1/0128; G02F 1/0131; G02F 1/0305; G02F 1/035; G02F 1/0353; G02F 1/0356; G02F 1/05; G02F 1/07; G02F 1/13; G02F 1/133524; G02F 1/33526; G02F 1/133528; G02F 1/1336; G02F 1/13471; G02F 1/13475; G02F 1/1393; G02F 1/213; G02F 1/225; G02F 1/292; G02F 1/3515; G02F 1/3551; G02F 1/3558; G02F 2201/122; G02F 2201/123; G02F 2201/18; G02F 2201/34; G02F 2201/38; G02F 2202/28; G02F 2202/32; G02F 2202/36; G02F 2203/01; G02F 2203/10; G02F 2203/15; G02F 1/0018; G02F 1/0121; G02F 1/015; G02F 1/0157; G02F 1/017; G02F 1/01708; G02F 1/0327; G02F 1/0333; G02F 1/0533; G02F 1/0555; G02F 1/116; G02F 1/125; G02F 1/132; G02F 1/13306; G02F 1/1333; G02F 1/133362; G02F 1/133368; G02F 1/13338; G02F 1/133385; G02F 1/133502; G02F 1/133531; G02F 1/133536; G02F 1/133543; G02F 1/133545; G02F 1/13355; G02F 1/13362; G02F 1/133621; G02F 1/133633; G02F 1/1341; G02F 1/134336; G02F 1/134345; G02F 1/13439; G02F 1/1347; G02F 1/135; G02F 1/13606; G02F 1/1362; G02F 1/136227; G02F 1/136286; G02F 1/368; G02F 1/13718; G02F 1/1395; G02F 1/153; G02F 1/1679; G02F 1/17; G02F 1/174; G02F 1/195; G02F 1/211; G02F 1/2252; G02F 1/293; G02F 1/294; G02F 1/2955; G02F 1/3136; G02F 1/3137; G02F 1/33; G02F 1/3511; G02F 1/3526; G02F 1/3538; G02F 1/39; G02F 2/00; G02F 2/004; G02F 2/02; G02F 2201/02; G02F 2201/07; G02F 2201/121; G02F 2201/127; G02F 2201/128; G02F 2201/30; G02F 2201/305; G02F 2201/346; G02F 2201/58; G02F 2202/107; G02F 2202/14; G02F 2203/09; G02F 2203/19; G02F 2203/26; G02F 2203/34; G02F 2203/50; G02F 2203/52; G02F 2203/60; G02F 2203/62; G02F 3/022
USPC ........................................................ 359/281
See application file for complete search history.

(56) References Cited

U.S. PATENT DOCUMENTS 6,381,056 B1    4/2002   Ellis
2014/0348460 A1   11/2014   Dorin et al.

OTHER PUBLICATIONS

Yamazaki, H., et al., "PDM-QPSK Modulator With a Hybrid Configuration of Silica PLCs and LiNbO3 Phase Modulators," Journal of Lightwave Technology, vol. 29, Issue 5, pp. 721-727 (Mar. 1, 2011).
Zhu, Z., et al., "Dynamic Range Improvement for an Analog Photonic Link Using an Integrated Electro-Optic Dual-Polarization Modulator," IEEE Photonics Journal, vol. 8, Issue 2, pp. 1-11 (Apr. 2016).

MODULATOR ASSEMBLY AND METHOD FOR MODULATING LIGHT

CROSS-REFERENCE TO A RELATED APPLICATION

This application is a National Phase Patent Application of International Patent Application Number PCT/EP2017/082140, filed on Dec. 11, 2017, which claims priority of German Patent Application Number 10 2016 224 615.1, filed on Dec. 9, 2016.

BACKGROUND

This disclosure relates to a modulator assembly for modulating light and to a method for modulating light.

Optical communication systems frequently use polarization multiplex methods in which various polarization components of a light wave are modulated with different data signals. The light generated by a light source therefor is split up e.g. into separate optical paths, wherein the light waves in the different optical paths are modulated independently. Subsequently, the polarization of the light wave of one of the optical paths is rotated and the light waves of the optical paths are combined by means of a polarization combiner. An example for such construction is disclosed in the article H. Yamazaki, T. Yamada, T. Goh, and A. Kaneko, "PDM-QPSK Modulator With a Hybrid Configuration of Silica PLCs and LiNbO Phase Modulators", Journal of Lightwave Technology, vol. 29, no. 5, pp. 721-727, March 2011. Such systems however are technically complex and require a relatively large installation space.

SUMMARY

The problem underlying the proposed solution consists in creating a simpler and more compact construction for the modulation of light.

This problem is solved by creating the modulator assembly with features as described herein and the method with features as described herein.

Accordingly, there is provided a modulator assembly for modulating light, comprising a first and a second electro-absorption modulator, which each at least substantially only act on one polarization component of incident light;

a light generating assembly for generating light which has a first and a second polarization component;

a first electro-absorption modulator for modulating the light generated by the light generating assembly, wherein the first electro-absorption modulator at least substantially only modulates the first polarization component of the light, so that the light exiting from the first electro-absorption modulator includes a modulated and an unmodulated polarization component;

a polarization converter (e.g. a polarization rotator) for changing the polarization direction of the light exiting from the first electro-absorption modulator, wherein the light exiting from the polarization converter couples into the second electro-absorption modulator and is polarized such that by means of the second electro-absorption modulator a modulation at least substantially is effected only of the previously unmodulated polarization component.

By means of the modulator assembly according to the solution a separation of an optical input signal (of an input light wave) into separate optical paths can be omitted. In particular, a polarization combiner for combining the optical paths also can be omitted thereby, which provides for a more compact construction of the modulator assembly and hence e.g. also of a transmitter for an optical communication system.

The modulation of the light by means of the first electro-absorption modulator may be effected by applying an electric voltage to the modulator, wherein the electric voltage represents a first data signal. Correspondingly, by applying a second electric voltage to the second electro-absorption modulator a second data signal, which is different from the first data signal, can be modulated.

It is conceivable that the first and the second electro-absorption modulator are configured such that they act on the same polarization component (polarization direction) of the incident light. In particular, the construction and the orientation of the first and the second electro-absorption modulator are identical. The first and the second electro-absorption modulator each may act only on the TE polarization component of the incident light. Such electro-absorption modulators are known per se from the prior art, wherein their active region comprises e.g. a multi-quantum well (MQW). Due to the separation into light- and heavy-hole bands caused by the MQW, such electro-absorption modulators substantially modulate exclusively TE-polarized light. TM-polarized light on the other hand passes through the electro-absorption modulator without experiencing a modulation.

According to a development of the solution the light generating assembly comprises a light source (for example a semiconductor laser) for generating linearly polarized light and an input polarization converter, wherein the input polarization converter changes (in particular rotates) the polarization direction of the light generated by the light source such that the light exiting from the input polarization converter and coupling into the first electro-absorption modulator includes the first and the second polarization component.

It is conceivable that the light source generates TE-polarized light and the input polarization converter effects a modification (e.g. a rotation) of the polarization of this light, so that the rotated polarization comprises a TE and a TM polarization component. The input polarization converter may be a polarization converter which rotates the polarization direction of the light generated by the light source by approximately 45°. The input polarization converter can be formed by a λ/4 retarder (in particular a λ/4 plate) configured (e.g. orientated) in such a way that it creates (e.g. phase shifted) TE and TM polarization components. Of course, other types of polarization converters might be used.

It should be noted that it is also conceivable to omit the input polarization converter and use a light source which already generates light with a TM and a TE polarization component.

According to another embodiment the polarization converter is configured to change the polarization direction of the light exiting from the first electro-absorption modulator such that it rotates the polarization direction of the light by 90°. The polarization converter may be a λ/2 retarder (in particular a λ/2 plate).

It is also possible that the first and the second electro-absorption modulator and the polarization converter are integrated optical elements which are arranged on a common substrate. The light exiting from the first electro-absorption modulator may be coupled into the polarization converter via an integrated optical waveguide. Correspondingly, the light exiting from the polarization converter also can be coupled into the second electro-absorption modulator via an integrated optical waveguide.

The solution also relates to a transmitter which comprises a modulator assembly according to the solution and to an optical communication system, in particular a polarization multiplex system, with such transmitter.

Furthermore, the solution also relates to a method for modulating light, in particular by using a modulator assembly configured as described above, comprising the steps:

providing a first and a second electro-absorption modulator which each at least substantially act only on one polarization component of incident light;

generating light which has a first and a second polarization component;

modulating the light by means of the first electro-absorption modulator such that at least substantially only the first polarization component of the light is modulated, so that the light exiting from the first electro-absorption modulator includes a modulated and an unmodulated polarization component;

changing the polarization direction of the light exiting from the first electro-absorption modulator and coupling the light exiting from the polarization converter into the second electro-absorption modulator such that by means of the second electro-absorption modulator a modulation at least substantially is effected only of the previously unmodulated polarization component.

The embodiments described above with respect to the modulator assembly according to the solution analogously can of course also be used for developing the method according to the solution.

BRIEF DESCRIPTION OF THE DRAWINGS

The solution will subsequently be explained in detail by means of embodiments with reference to the Figures.

DETAILED DESCRIPTION

Figure 1:
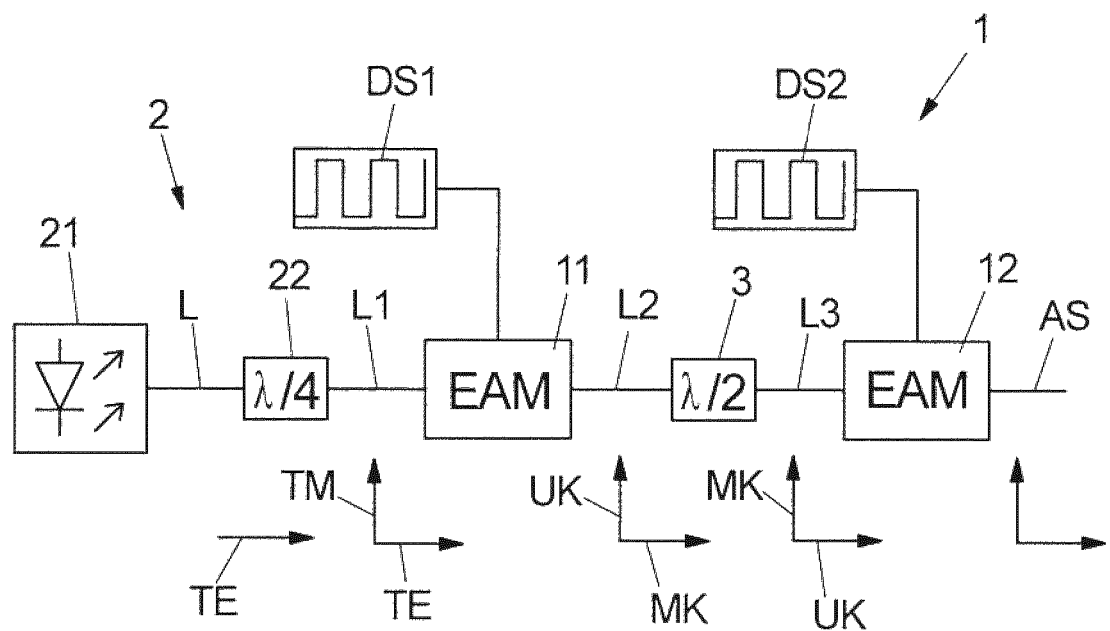
FIG. 1 shows a block diagram of a modulator assembly according to an embodiment of the invention.

The modulator assembly 1 according to the solution, which is schematically shown in FIG. 1, comprises a first and a second electro-absorption modulator (EAM) 11, 12, wherein the electro-absorption modulators 11, 12 are arranged serially one behind the other. Furthermore, the modulator assembly 1 comprises a light generating assembly 2 with a light source in the form of a semiconductor laser 21, wherein the semiconductor laser 21 at least substantially emits TE-polarized light.

The light generated by the laser 21 is coupled into the first electro-absorption modulator 11, wherein the light generating assembly 2 includes an input polarization converter in the form of a λ/4 retarder 22. By means of the λ/4 retarder 22 the TE-polarized light L emitted by the laser 21 is converted (e.g. rotated by 45°) in such a way that the light L1 coupling out from the λ/4 retarder includes both a TE and a TM polarization component (which are e.g. phase shifted relative to one another). Of course, other polarization converters could be used for rotating the polarized light L.

The two electro-absorption modulators 11, 12 are configured such that they each only act on the TE polarization component of the light coupled into the same, i.e. only the TE component of the light coupled in experiences a modulation. Correspondingly, only a modulation of the TE polarization component of the light L1, but not of the TM component is effected in the first electro-absorption modulator 11. The modulation in the first electro-absorption modulator 11 is effected by applying a voltage which represents a first data signal DS1. The light L2 exiting from the first electro-absorption modulator 11 consequently includes a modulated TE polarization component MK and an unmodulated TM polarization component UK.

Between the two electro-absorption modulators 11, 12 a polarization converter in the form of a λ/2 retarder 3 is provided. The light L2 exiting from the first electro-absorption modulator 11 is coupled into the second electro-absorption modulator 12 via the λ/2 retarder 3, wherein the polarization of the light is rotated by 90° upon passage through the λ/2 retarder 3. The directions of the modulated and the non-modulated polarization component MK, UK thereby are reversed, so that the light L3 exiting from the λ/2 retarder 3 now includes a modulated component MK in TM direction and an unmodulated component UK in TE direction. Thus, the previously not modulated component UK is modulated by the second electro-absorption modulator 12, wherein in particular a second data signal DS2 different from the first data signal DS1 is modulated. The output signal AS exiting from the second electro-absorption modulator 12 thus comprises a TM polarization component modulated with the first data signal DS1 and a TE polarization component modulated with the second data signal DS2.

Figure 2:
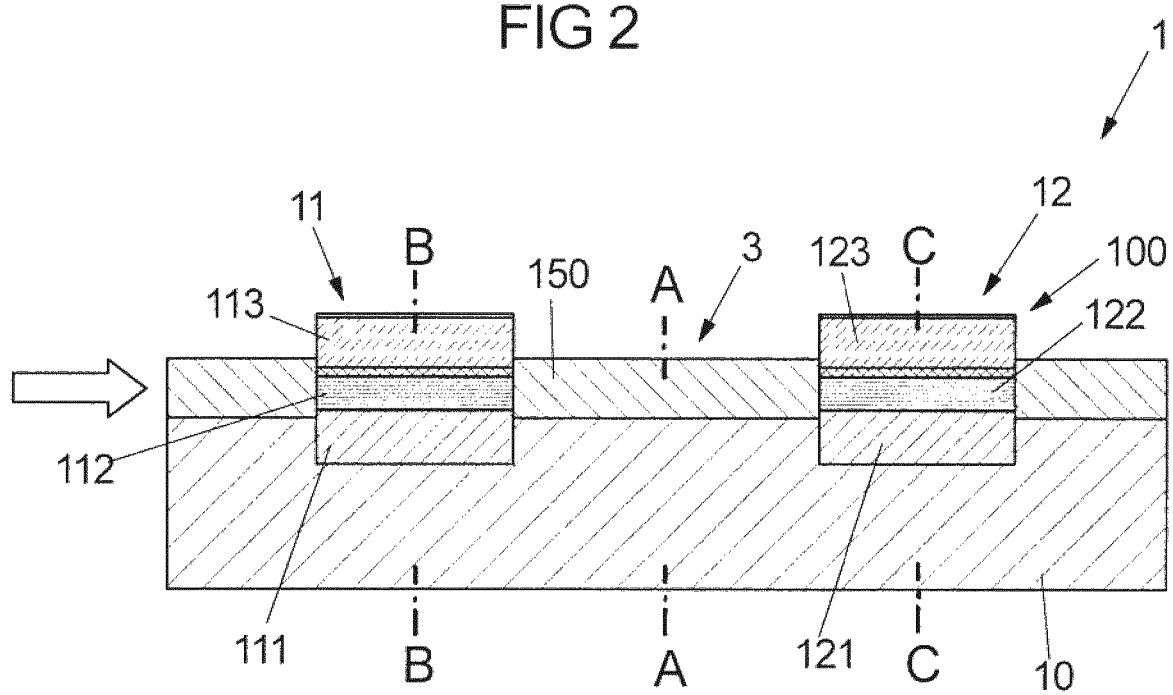
FIG. 2 shows a sectional view of a modulator assembly according to a further embodiment of the invention.

FIG. 2 shows a possible configuration of the modulator assembly 1 according to the solution as integrated optical semiconductor component 100. Accordingly, the semiconductor component 100 comprises a substrate 10 on which the electro-absorption modulators 11, 12 and also the polarization converter 3 are integrated. The electro-absorption modulators 11, 12 in particular have an identical layer structure.

The layer structure of the electro-absorption modulators 11, 12 each may comprise at least one lower n-doped layer 111, an active region with a multi-quantum well (MQW) 112 and at least one upper p-doped layer 113. The substrate 10 e.g. is a semi-insulating substrate, such as in the form of a semi-insulating InP substrate. The two electro-absorption modulators 11, 12 are connected with each other via an optical waveguide 150. Via the optical waveguide 150 light exiting from the first electro-absorption modulator 11 is coupled into the second electro-absorption modulator 11 via the polarization converter 3.

Figure 4:
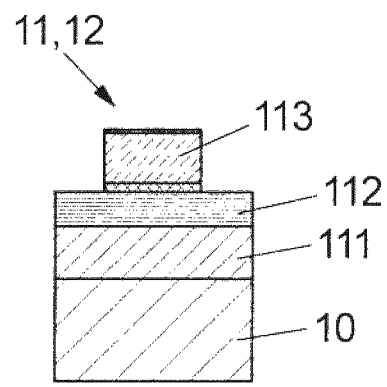
FIG. 4 shows a section along B-B or C-C in FIG. 2.

A section through the electro-absorption modulators 11, 12 is shown in FIG. 4. It can also be seen there that the electro-absorption modulators 11, 12 each include a rib waveguide structure, wherein in particular the p-doped layer 113 forms a rib structure.

Figure 3:
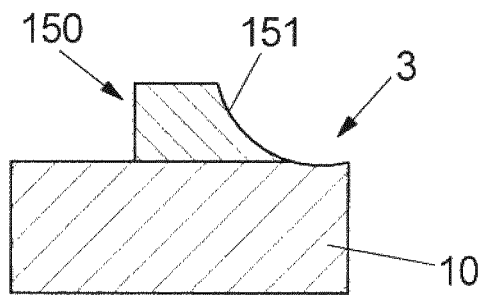
FIG. 3 shows a section along A-A in FIG. 2.

The polarization converter 3 shown in FIG. 3 in a sectional view is configured as a portion of the waveguide 150, wherein the waveguide 150 in this portion has a concavely curved side 151.

However, the solution is of course not limited to a particular configuration of the polarization converter 3. Rather, any types of polarization converters can be used in principle.

The invention claimed is:

1. A modulator assembly for modulating light, comprising:
a first and a second electro-absorption modulator, which each at least substantially act only on one polarization component of incident light;
a light generating assembly for generating light which has a first and a second polarization component;
a first electro-absorption modulator for modulating the light generated by the light generating assembly, wherein the first electro-absorption modulator at least substantially only modulates the first polarization component of the light, so that the light exiting from the first electro-absorption modulator has a modulated and an unmodulated polarization component;
a polarization converter for changing the polarization direction of the light exiting from the first electro-absorption modulator, wherein:
the light exiting from the polarization converter couples into the second electro-absorption modulator and is polarized such that by means of the second electro-absorption modulator a modulation at least substantially is effected only of the previously unmodulated polarization component.

2. The modulator assembly according to claim 1, wherein the first and the second electro-absorption modulator act on the same polarization component of the incident light.

3. The modulator assembly according to claim 1, wherein the first and the second electro-absorption modulator each act only on one TE polarization component of the incident light.

4. The modulator assembly according to claim 1, wherein the light generating assembly includes a light source for generating linearly polarized light and an input polarization converter, wherein the input polarization converter changes the polarization direction of the light generated by the light source such that the light exiting from the input polarization converter and coupling into the first electro-absorption modulator includes the first and the second polarization component.

5. The modulator assembly according to claim 1, wherein the first and the second polarization component are oriented vertically to each other.

6. The modulator assembly according to claim 1, wherein the first polarization component is a TE polarization component and the second polarization component is a TM polarization component.

7. The modulator assembly according to claim 4, wherein the light source generates TE-polarized light.

8. The modulator assembly according to claim 4, wherein the input polarization converter rotates the polarization direction of the light generated by the light source by 45°.

9. The modulator assembly according to claim 4, wherein the input polarization converter is formed by a $\lambda/4$ retarder.

10. The modulator assembly according to claim 1, wherein the polarization converter rotates the light exiting from the first electro-absorption modulator by 90°.

11. The modulator assembly according to claim 10, wherein the polarization converter is formed by a $\lambda/2$ retarder.

12. The modulator assembly according to claim 1, wherein the first and the second electro-absorption modulator and the polarization converter are integrated optical elements which are arranged on a common substrate.

13. The modulator assembly according to claim 12, wherein the light exiting from the first electro-absorption modulator couples into the polarization converter via an integrated optical waveguide.

14. An optical communication arrangement with a transmitter which comprises a modulator assembly according to claim 1.

15. A method for modulating light comprising the steps:
providing a first and a second electro-absorption modulator, which each at least substantially act only on one polarization component of incident light;
generating light which includes a first and a second polarization component;
modulating the light by means of the first electro-absorption modulator such that at least substantially only the first polarization component of the light is modulated, so that the light exiting from the first electro-absorption modulator includes a modulated and an unmodulated polarization component; and
changing the polarization direction of the light exiting from the first electro-absorption modulator and coupling the light exiting from the polarization converter into the second electro-absorption modulator such that by means of the second electro-absorption modulator a modulation at least substantially is effected only of the previously unmodulated polarization component.

* * * * *